(12) United States Patent
Chang et al.

(10) Patent No.: US 8,638,983 B2
(45) Date of Patent: Jan. 28, 2014

(54) DIGITAL IMAGE PROCESSING APPARATUS, TRACKING METHOD, RECORDING MEDIUM FOR STORING COMPUTER PROGRAM FOR EXECUTING THE TRACKING METHOD, AND DIGITAL IMAGE PROCESSING APPARATUS ADOPTING THE TRACKING METHOD

(75) Inventors: Soon-keun Chang, Suwon-si (KR); Eun-sun Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 652 days.

(21) Appl. No.: 12/724,581

(22) Filed: Mar. 16, 2010

(65) Prior Publication Data

US 2010/0239125 A1 Sep. 23, 2010

(30) Foreign Application Priority Data

Mar. 17, 2009 (KR) .................... 10-2009-0022746

(51) Int. Cl.
*G06K 9/00* (2006.01)
(52) U.S. Cl.
USPC ............................ 382/103; 382/104; 382/106
(58) Field of Classification Search
USPC .............. 382/100, 103, 104, 193, 115–119, 382/164–167, 170–173, 203, 232, 237; 345/90, 473, 705, 707, 709, 150, 154, 345/419; 340/541, 542, 5.1, 5.2, 5.32, 5.53, 340/5.7, 5.83; 707/1, 803; 701/1–9; 348/333.1, 333.01, 333.12, 222.1, 345, 348/347, 77, 169–173, 577, 647, 657; 358/500, 504–505, 515–520, 522, 538; 715/700, 716
See application file for complete search history.

(56) References Cited

U.S. PATENT DOCUMENTS

| | | | | |
|---|---|---|---|---|
| 5,912,980 | A * | 6/1999 | Hunke | 382/103 |
| 6,268,939 | B1 * | 7/2001 | Klassen et al. | 358/518 |
| 6,400,830 | B1 * | 6/2002 | Christian et al. | 382/103 |
| 6,404,925 | B1 * | 6/2002 | Foote et al. | 382/224 |
| 6,661,907 | B2 * | 12/2003 | Ho et al. | 382/118 |
| 6,819,783 | B2 * | 11/2004 | Goldberg et al. | 382/115 |
| 7,620,218 | B2 * | 11/2009 | Steinberg et al. | 382/118 |
| 2004/0221237 | A1 * | 11/2004 | Foote et al. | 715/700 |
| 2006/0215880 | A1 * | 9/2006 | Berthilsson et al. | 382/103 |
| 2010/0060727 | A1 * | 3/2010 | Steinberg et al. | 348/77 |
| 2010/0329547 | A1 * | 12/2010 | Cavet | 382/164 |
| 2012/0020559 | A1 * | 1/2012 | Deng et al. | 382/173 |

\* cited by examiner

*Primary Examiner* — Hadi Akhavannik
*Assistant Examiner* — Mehdi Rashidian
(74) *Attorney, Agent, or Firm* — Drinker Biddle & Reath LLP

(57) ABSTRACT

A digital image processing apparatus and tracking method are provided to rapidly and accurately track a subject location in video images. The apparatus searches for a target image that is most similar to a reference image, in a current frame image in which each pixel has luminance, and other, data, the reference image being smaller than the current frame image, and includes a similarity calculator for calculating a degree of similarity between the reference image and each of a plurality of matching images that have the same size as the reference image and are portions of the current frame image; and a target image determination unit for determining one of the plurality of matching images as the target image using the degree of similarity obtained by the similarity calculator. The similarity calculator calculates the degree of similarity by applying greater weight to the other data than to the luminance data.

18 Claims, 6 Drawing Sheets

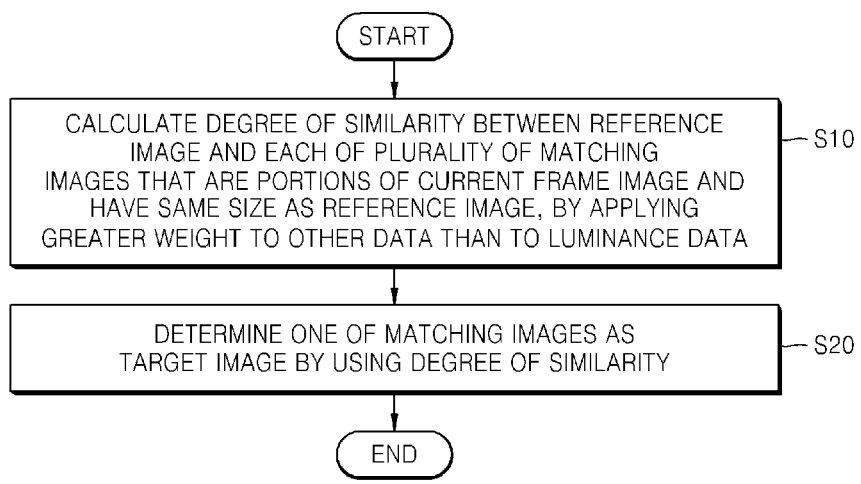

DIGITAL IMAGE PROCESSING APPARATUS, TRACKING METHOD, RECORDING MEDIUM FOR STORING COMPUTER PROGRAM FOR EXECUTING THE TRACKING METHOD, AND DIGITAL IMAGE PROCESSING APPARATUS ADOPTING THE TRACKING METHOD

CROSS-REFERENCE TO RELATED PATENT APPLICATION

This application claims the benefit of Korean Patent Application No. 10-2009-0022746, filed on Mar. 17, 2009, in the Korean Intellectual Property Office, the disclosure of which is incorporated herein in its entirety by reference.

BACKGROUND

The invention relates to a digital image processing apparatus, a tracking method, a recording medium for storing a computer program for executing the tracking method, and a digital image processing apparatus adopting the tracking method, and more particularly, to a digital image processing apparatus, a tracking method, a recording medium for storing a computer program for executing the tracking method, and a digital image processing apparatus adopting the tracking method to rapidly and accurately track the location of a certain subject in a video image.

In general, a digital image processing apparatus displays a video image corresponding to data of a video file stored in a recording medium on a display unit. In particular, a digital photographing apparatus (an example of a digital image processing apparatus) displays a video image (a live-view video image) on a display unit or stores a video file in a recording medium by using data obtained from light incident on an imaging device.

The digital photographing apparatus has a tracking function for tracking the location of a certain subject in a video image. The tracking function is performed by determining a portion of a frame image which is most similar to a reference image (template) as a target image (tracking region). The reference image is an image including the entire subject or a portion of the subject to be tracked and is smaller than the frame image.

However, in a conventional digital image processing apparatus having a tracking function, an error may occur when determining a portion of each frame image which is most similar to a reference image as a target image, and thus a tracking error may easily occur due to an inaccurate determination of the target image.

SUMMARY

An embodiment of the invention provides a digital image processing apparatus, a tracking method, a recording medium for storing a computer program for executing the tracking method, and a digital image processing apparatus adopting the tracking method to rapidly and accurately track the location of a subject in a video image.

According to an embodiment of the invention, there is provided a digital image processing apparatus for searching for a target image that is most similar to a reference image, in a current frame image in which each pixel has luminance data and other data, the reference image being smaller than the current frame image, the apparatus including a similarity calculation unit for calculating a degree of similarity between the reference image and each of a plurality of matching images that have the same size as the reference image and is a portion of the current frame image; and a target image determination unit for determining one of the plurality of matching images as the target image by using the degree of similarity that is obtained by the similarity calculation unit, wherein the similarity calculation unit calculates the degree of similarity by applying a greater weight to the other data than to the luminance data.

Each pixel of the current frame image may have luminance data Y, first chromaticity data C1, and second chromaticity data C2, and, if it is assumed that $Y_R(i,j)$, $C1_R(i,j)$, and $C2_R(i,j)$ respectively represent luminance data, first chromaticity data, and second chromaticity data of a pixel (i,j) in the reference image, and $Y_M(i,j)$, $C1_M(i,j)$, and $C2_M(i,j)$ respectively represent luminance data, first chromaticity data, and second chromaticity data of a pixel (i,j) in a matching image, the similarity calculation unit may calculate a degree of similarity S between the reference image and the matching image by using Equation 1 wherein $\alpha<\beta$, $\alpha<\gamma$, and $\alpha$, $\beta$, and $\gamma$ are positive weights.

$$S=\alpha\Sigma|Y_R(i,j)-Y_M(i,j)|+\beta\Sigma|C1_R(i,j)-C1_M(i,j)|+\gamma\Sigma|C2_R(i,j)-C2_M(i,j)| \qquad (1)$$

Each pixel of the current frame image may have luminance data Y, first chromaticity data C1, and second chromaticity data C2, and, if it is assumed that $Y_R(i,j)$, $C1_R(i,j)$, and $C2_R(i,j)$ respectively represent luminance data, first chromaticity data, and second chromaticity data of a pixel (i,j) in the reference image, and $Y_M(i,j)$, $C1_M(i,j)$, and $C2_M(i,j)$ respectively represent luminance data, first chromaticity data, and second chromaticity data of a pixel (i,j) in a matching image, the similarity calculation unit may calculate a degree of similarity S between the reference image and the matching image by using Equation 2 wherein $\alpha<\beta$, $\alpha<\gamma$, and $\alpha$, $\beta$, and $\gamma$ are positive weights.

$$S=\alpha\Sigma|Y_R(i,j)-Y_M(i,j)|^2+\beta\Sigma|C1_R(i,j)-C1_M(i,j)|^2+\gamma\Sigma|C2_R(i,j)-C2_M(i,j)|^2 \qquad (2)$$

Each pixel of the current frame image may have luminance data Y, first chromaticity data C1, and second chromaticity data C2, and, if it is assumed that $Y_R(i,j)$, $C1_R(i,j)$, and $C2_R(i,j)$ respectively represent luminance data, first chromaticity data, and second chromaticity data of a pixel (i,j) in the reference image, and $Y_M(i,j)$, $C1_M(i,j)$, and $C2_M(i,j)$ respectively represent luminance data, first chromaticity data, and second chromaticity data of a pixel (i,j) in a matching image, and $Y_R(i,j)-Y_M(i,j)$, $C1_R(i,j)-C1_M(i,j)$, and $C2_R(i,j)-C2_M(i,j)$ respectively represent a luminance value, a first chromaticity value, and a second chromaticity value, the similarity calculation unit may calculate a degree of similarity S between the reference image and the matching image by using Equation 3 wherein $\alpha<\beta$, $\alpha<\gamma$, and $\alpha$, $\beta$, and $\gamma$ are positive weights.

$$S=\alpha\times\{\text{luminance value}\}+\beta\times\{\text{first chromaticity value}\}+\gamma\times\{\text{second chromaticity value}\} \qquad (3)$$

$\beta=\gamma$ may be satisfied.

The target image determination unit may determine one of the plurality of matching images which has the lowest degree of similarity with the reference image as the target image.

According to another embodiment of the invention, there is provided a tracking method of searching for a target image that is most similar to a reference image, in a current frame image in which each pixel has luminance data and other data, the reference image being smaller than the current frame image, the method including calculating a degree of similarity between the reference image and each of a plurality of matching images that have the same size as the reference image and is a portion of the current frame image by applying a greater weight to the other data than to the luminance data.

Each pixel of the current frame image may have luminance data Y, first chromaticity data C1, and second chromaticity data C2, and, if it is assumed that $Y_R(i,j)$, $C1_R(i,j)$, and $C2_R(i,j)$ respectively represent luminance data, first chromaticity data, and second chromaticity data of a pixel (i,j) in the reference image, and $Y_M(i,j)$, $C1_M(i,j)$, and $C2_M(i,j)$ respectively represent luminance data, first chromaticity data, and second chromaticity data of a pixel (i,j) in a matching image, a degree of similarity S between the reference image and the matching image may be calculated by using Equation 1 wherein $\alpha<\beta$, $\alpha<\gamma$, and $\alpha$, $\beta$, and $\gamma$ are positive weights.

$$S=\alpha\Sigma|Y_R(i,j)-Y_M(i,j)|+\beta\Sigma|C1_R(i,j)-C1_M(i,j)|+\gamma\Sigma|C2_R(i,j)-C2_M(i,j)| \quad (1)$$

Each pixel of the current frame image may have luminance data Y, first chromaticity data C1, and second chromaticity data C2, and, if it is assumed that $Y_R(i,j)$, $C1_R(i,j)$, and $C2_R(i,j)$ respectively represent luminance data, first chromaticity data, and second chromaticity data of a pixel (i,j) in the reference image, and $Y_M(i,j)$, $C1_M(i,j)$, and $C2_M(i,j)$ respectively represent luminance data, first chromaticity data, and second chromaticity data of a pixel (i,j) in a matching image, a degree of similarity S between the reference image and the matching image may be calculated by using Equation 2 wherein $\alpha<\beta$, $\alpha<\gamma$, and $\alpha$, $\beta$, and $\gamma$ are positive weights.

$$S=\alpha\Sigma|Y_R(i,j)-Y_M(i,j)|^2+\beta\Sigma|C1_R(i,j)-C1_M(i,j)|^2+\gamma\Sigma|C2_R(i,j)-C2_M(i,j)|^2 \quad (2)$$

Each pixel of the current frame image may have luminance data Y, first chromaticity data C1, and second chromaticity data C2, and, if it is assumed that $Y_R(i,j)$, $C1_R(i,j)$, and $C2_R(i,j)$ respectively represent luminance data, first chromaticity data, and second chromaticity data of a pixel (i,j) in the reference image, and $Y_M(i,j)$, $C1_M(i,j)$, and $C2_M(i,j)$ respectively represent luminance data, first chromaticity data, and second chromaticity data of a pixel (i,j) in a matching image, and $Y_R(i,j)-Y_M(i,j)$, $C1_R(i,j)-C1_M(i,j)$, and $C2_R(i,j)-C2_M(i,j)$ respectively represent a luminance value, a first chromaticity value, and a second chromaticity value, a degree of similarity S between the reference image and the matching image may be calculated by using Equation 3 wherein $\alpha<\beta$, $\alpha<\gamma$, and $\alpha$, $\beta$, and $\gamma$ are positive weights.

$$S=\alpha\times\{\text{luminance value}\}+\beta\times\{\text{first chromaticity value}\}+\gamma\times\{\text{second chromaticity value}\} \quad (3)$$

$\beta=\gamma$ may be satisfied.

One of the plurality of matching images which has the lowest degree of similarity with the reference image may be determined as the target image.

According to another embodiment of the invention, there is provided a computer program product, comprising a computer usable medium having a computer readable program code embodied therein, said computer readable program code adapted to be executed to implement the above-described method.

According to another embodiment of the invention, there is provided a digital image processing apparatus adopting the above-described method.

BRIEF DESCRIPTION OF THE DRAWINGS

The above and other features and advantages will become more apparent by describing in detail exemplary embodiments thereof with reference to the attached drawings in which:

FIG. 9 is a flowchart of a tracking method according to an embodiment of the invention.

DETAILED DESCRIPTION OF THE EMBODIMENTS

Hereinafter, the various embodiments of the invention will be described in detail with reference to the attached drawings.

Figure 1:
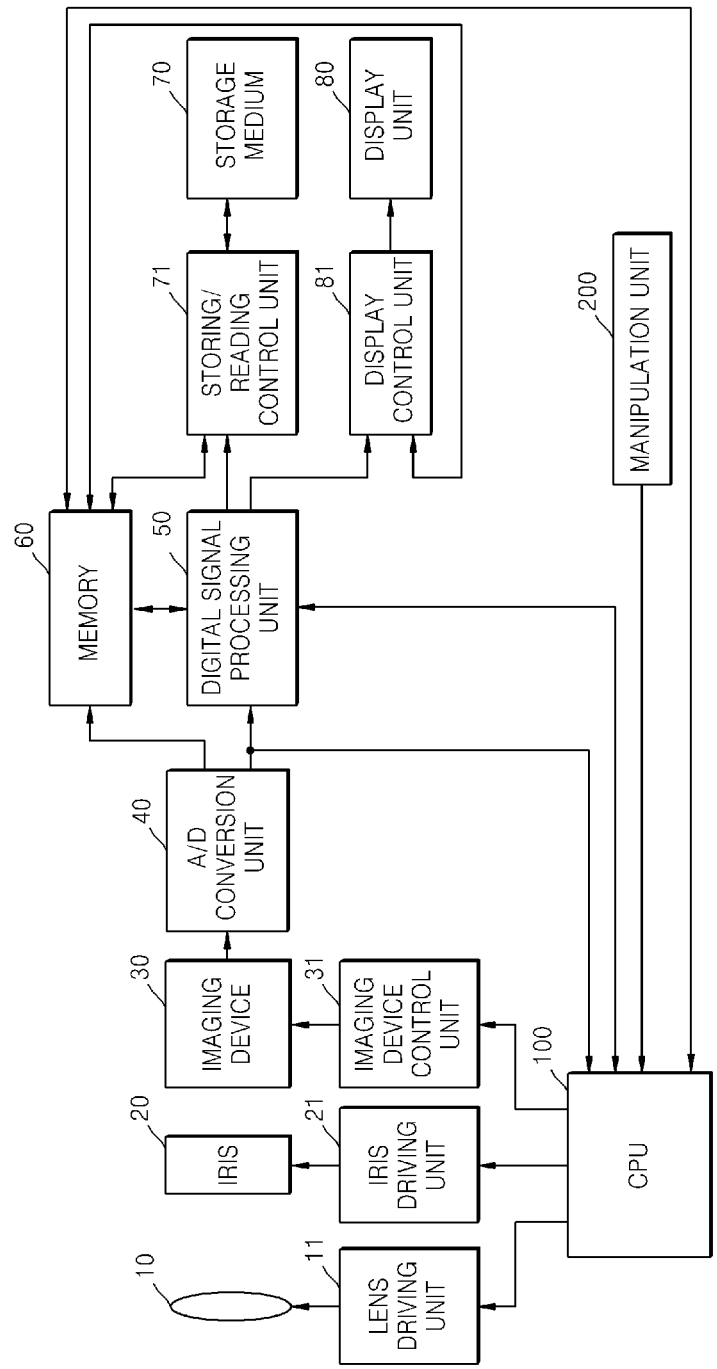
FIG. 1 is a block diagram of a digital photographing apparatus as an example of a digital image processing apparatus according to an embodiment of the invention.
Figure 2:
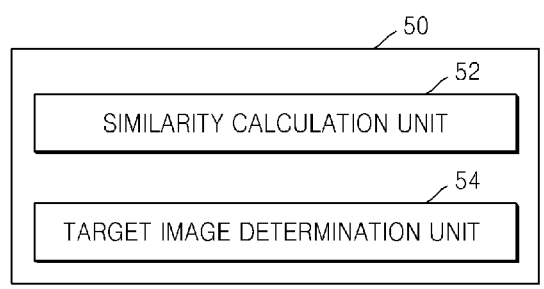
FIG. 2 is a block diagram of a portion of the digital photographing apparatus illustrated in FIG. 1.

FIG. 1 is a block diagram of a digital photographing apparatus as an example of a digital image processing apparatus according to an embodiment of the invention. FIG. 2 is a block diagram of a portion of the digital photographing apparatus illustrated in FIG. 1.

A central processing unit (CPU) 100 controls operations of the digital photographing apparatus. The digital photographing apparatus also includes a manipulation unit 200 having a key generating an electrical signal based on a user's input. An electrical signal generated by the manipulation unit 200 is transmitted to the CPU 100 so that the CPU 100 may control the digital photographing apparatus in response to the electrical signal.

In a shooting mode, when an electrical signal based on a user's input is input to the CPU 100, the CPU 100 analyzes the electrical signal and controls a lens driving unit 11, an iris driving unit 21, and an imaging device control unit 31, thereby controlling the location of a lens 10, the degree of openness of an iris 20, and the sensitivity of an imaging device 30, respectively. The imaging device 30 generates data from incident light. An analog/digital (A/D) conversion unit 40 converts analog data output from the imaging device 30 into digital data. The A/D conversion unit 40 may not be included according to characteristics of the imaging device 30, for example, if the imaging device 30 is a digital device.

The data output from the imaging device 30 may be input to a digital signal processing (DSP) unit 50 directly or via a memory 60. The data output from the imaging device 30 may also be input to the CPU 100, if necessary. The memory 60 may be read-only memory (ROM) or random access memory (RAM). The DSP unit 50 may perform digital signal processing, such as gamma correction, white balance correction, and the like, if needed. Also, as will be described later, the DSP unit 50 may include a similarity calculation unit 52 and a target image determination unit 54 in order to efficiently determine a target image. The target image is a portion of a frame image and corresponds to a reference image. The similarity calculation unit 52 and the target image determination unit 54 may be separated from the DSP unit 50 or may be included in another component of the digital photographing apparatus. The functions of the similarity calculation unit 52 and the target image determination unit 54 will be described later.

The data output from the DSP unit 50 is transmitted to a display control unit 81 directly or via the memory 60. The display control unit 81 controls a display unit 80 to display a video image. The data output from the DSP unit 50 is input to a storing/reading control unit 71 directly or via the memory 60. The storing/reading control unit 71 stores the data in a storage medium 70 automatically or in response to a signal based on a user's input. The storing/reading control unit 71 may read data from a file stored in the storage medium 70, and may input the data to the display control unit 81 via the memory 60 or another component so that the display unit 80 displays the video image. The storage medium 70 may be detachable or non-detachable from the digital photographing apparatus or may be partially both (e.g., built-in memory combined with, e.g., a removable memory card).

The digital photographing apparatus may not include all of the above components. In some cases, for example, the lens driving unit 11 and the iris driving unit 21 may not be included as long as the digital photographing apparatus includes the imaging device 30, the similarity calculation unit 52, and the target image determination unit 54. Furthermore, the invention is not limited to the digital photographing apparatus illustrated in FIG. 1 and may also be applied to image processing apparatuses such as a personal digital assistant (PDA) and a personal multimedia player (PMP). The same principal will be applied to other embodiments to be described later. Also, various changes may be made. For example, if the digital image processing apparatus is not a digital photographing apparatus, the imaging device 30 may not be included.

The functions of the similarity calculation unit 52 and the target image determination unit 54 will now be described with reference to FIGS. 3 through 5, 6A through 6C, 7, and 8.

Figure 3:
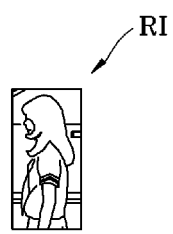
FIG. 3 is a pictorial view of a reference image.
Figure 4:
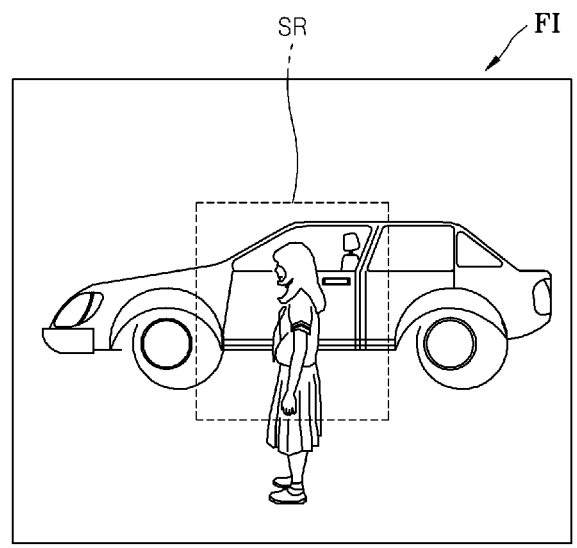
FIG. 4 is a pictorial view of a frame image and a search region.
Figure 5:
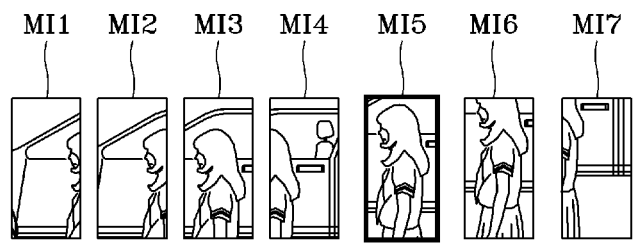
FIG. 5 is a pictorial view of matching images.

FIG. 3 is a pictorial view of a reference image RI, FIG. 4 is a conceptual view of a frame image FI and a search region SR, and FIG. 5 is a conceptual view of matching images MI1, MI2, MI3, MI4, MI5, MI6, and MI7.

The reference image RI is an image of a subject to be tracked. The frame image FI is a frame image of a video image obtained by the digital photographing apparatus. The frame image FI may also be a frame image of a video image of a file stored in a storage medium. The search region SR is a region in the frame image FI that is compared to the reference image RI in order to determine a target image. The target image is a portion of the frame image FI and corresponds to the reference image RI.

The matching images MI1, MI2, MI3, MI4, MI5, MI6, and MI7 are arbitrary images in the reference image RI and have the same size as the reference image RI. Although seven matching images (MI1, MI2, MI3, MI4, MI5, MI6, and MI7) are illustrated in FIG. 5, the number of matching images is not fixed to seven and may be differently set according to, for example, the size of the search region SR. The matching images MI1, MI2, MI3, MI4, MI5, MI6, and MI7 are candidates for the target image and one of the matching images MI1, MI2, MI3, MI4, MI5, MI6, and MI7, which is most similar to the reference image RI, is determined as the target image. For example, in FIG. 5, the matching image MI5 is most similar to the reference image RI and thus the matching image MI5 is determined as the target image.

The search region SR may be determined by using various methods. In general, when the target image is determined in a (t−1)th frame image, and then re-determined in a (t)th frame image, the location of the target image in the (t)th frame image is not greatly different from that in the (t−1)th frame image. Thus, the search region SR in the (t)th frame image may be determined as a region having a size twice or three times of the size of the target image in the (t−1)th frame image with reference to the location of the target image in the (t−1)th frame image, or a region obtained by adding a certain number of pixels to the width and the height of the target image in the (t−1)th frame image with reference to the location of the target image in the (t−1)th frame image.

Various changes may be made and thus the search region SR in the (t)th frame image may be determined by using another method. For example, the search region SR may be determined by using a method disclosed in Korean Patent Application No. 10-2008-0116370 filed by the present applicant on Nov. 21, 2008, which has not been yet published. The method disclosed in Korean Patent Application No. 10-2008-0116370 is incorporated by reference and will be briefly described with reference to FIGS. 6A through 6C.

Figure 6A:
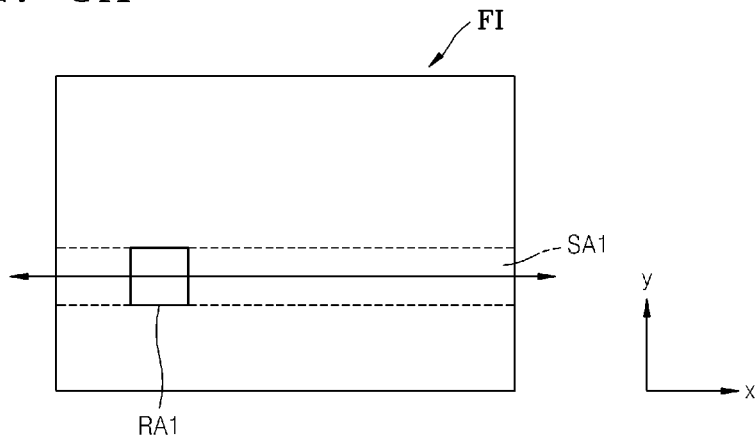
FIGS. 6A through 6C are pictorial views for describing a method of determining a search region.
Figure 6B:
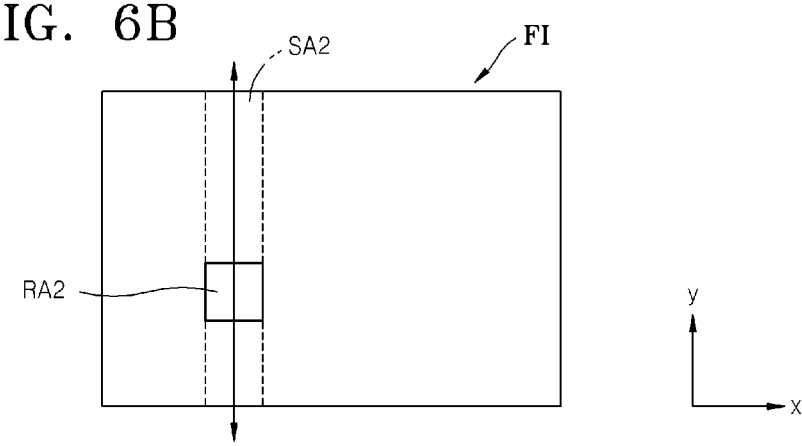
Figure 6C:
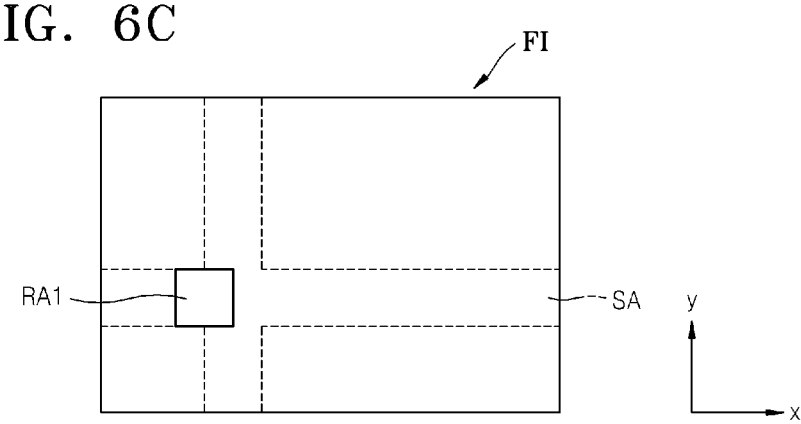

FIGS. 6A through 6C are pictorial views for describing the method of determining a search region disclosed in Korean Patent Application No. 10-2008-0116370.

Since the location of a target image in a (t)th frame image FI is not greatly different from that in a (t−1)th frame image, the search region is determined with reference to the location of the target image in the (t−1)th frame image. Initially, as illustrated in FIG. 6A, with reference to the location of the target image in the (t−1)th frame image, the location (coordinates) of a first reference region RA1 that has the same size as a reference image is fixed in a first direction (e.g., the y-axis direction) in the (t)th the frame image FI, a region in which the first reference region RA1 moves in a second direction (e.g., the x-axis direction) perpendicular to the first direction is determined as a first search region SA1, and a portion of the first search region/area SA1, which is most similar to the reference image, is determined as a temporary target image. Then, as illustrated in FIG. 6B, with reference to the location of the temporary target image, the location (coordinates) of a second reference region RA2 that has the same size as the temporary target image is fixed in the second direction (e.g., the x-axis direction), a region in which the second reference region RA2 moves in the first direction (e.g., the y-axis direction) perpendicular to the second direction is determined as a second search region SA2, and a portion of the second search region SA2, which is most similar to the reference image, is determined as an ultimate target image. In this case, as illustrated in FIG. 6C, a region including the first and second search regions SA1 and SA2 is a search region SA.

A method of determining a target image in the digital photographing apparatus illustrated in FIG. 1 will now be described with reference to FIGS. 7 and 8.

Figure 7:
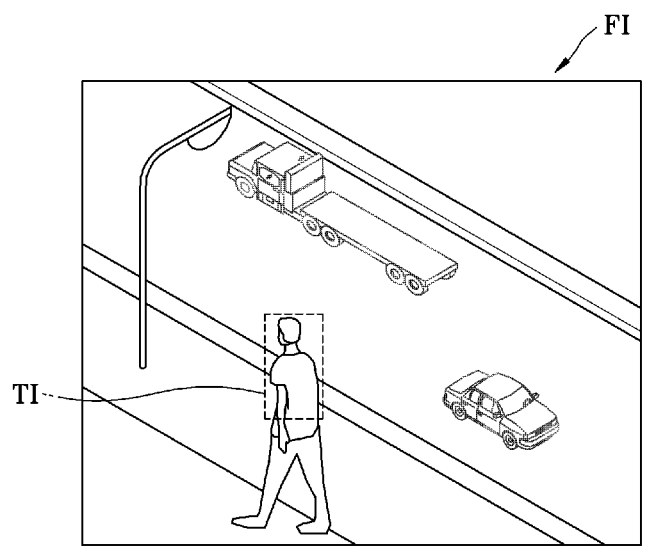
FIG. 7 is a pictorial view of a frame image and a target image.
Figure 8:
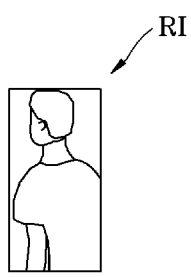
FIG. 8 is a pictorial view of a reference image.

FIG. 7 is a pictorial view of a frame image FI and a target image TI, and FIG. 8 is a pictorial view of a reference image RI.

A portion of the frame image FI, which corresponds to the reference image RI, may be accurately tracked and determined as the target image TI. Although the size of the reference image RI illustrated in FIG. 8 is greater than that of the target image TI illustrated in FIG. 7 for the sake of convenience, actually they are equal. However, the target image TI in the frame image FI may or may not completely match the reference image RI because a subject included in a tracking region may be changed.

As described above with reference to FIGS. 3 through 5 and 6A through 6C, a plurality of matching images may be set in a search region that may be determined by using various methods in the frame image FI. Thus, a degree of similarity between each matching image and the reference image RI is calculated and a matching image having the highest degree of similarity is determined as the target image TI. For this, in a conventional digital image processing apparatus, the degree of similarity is calculated by using Equation 4.

$$S = \Sigma |Y_R(i,j) - Y_M(i,j)| + \Sigma |C1_R(i,j) - C1_M(i,j) - C2_M(i,j)| \quad (4)$$

Here, it is assumed that each pixel has YCbCr data and Y, Cb (C1), and Cr (C2) respectively represent luminance data, first chromaticity data, and second chromaticity data. In more detail, in Equation 4, it is assumed that $Y_R(i,j)$, $C1_R(i,j)$, and $C2_R(i,j)$ respectively represent the luminance data, the first chromaticity data, and the second chromaticity data of a pixel (i,j) in the reference image RI, and $Y_M(i,j)$, $C1_M(i,j)$, and $C2_M(i,j)$ respectively represent the luminance data, the first chromaticity data, and the second chromaticity data of the pixel (i,j) in a matching image that is a portion of the frame image FI, has the same size as the reference image RI, and is compared to the reference image RI.

However, in the case of the conventional digital image processing apparatus using Equation 4, since the size of Y is greater than the size of C1 or C2 in the YCbCr data of each pixel, the calculated degree of similarity causes a tracking result in which a luminance difference is more dominant than a chromaticity difference. Accordingly, in various cases, for example, when the intensity of luminance provided to a subject to be tracked is instantly changed due to a luminance effect caused by headlights of a car passing by the subject at night, the conventional digital image processing apparatus may inaccurately determine the target image TI and thus may not perform rapid and accurate tracking.

However, in order to search for the frame image FI, in which each pixel has luminance data and other data, in order to determine the target image TI that is most similar to the reference image RI smaller than the frame image FI, the digital photographing apparatus illustrated in FIG. 1 includes the similarity calculation unit 52 for calculating the degree of similarity between the reference image RI and each matching image that is a portion of the frame image FI and has the same size as the reference image RI, and the target image determination unit 54 for determining one of the matching images as the target image TI by using the degree of similarity, which is obtained by the similarity calculation unit 52, and the similarity calculation unit 52 calculates the degree of similarity by applying a greater weight to the other data than to the luminance data. As such, unlike the conventional digital image processing apparatus, even in various cases, for example, when the intensity of luminance is changed, the target image TI may be accurately determined and thus rapid and accurate tracking may be performed.

In more detail, each pixel of the frame image FI has luminance data Y, first chromaticity data C1, and second chromaticity data C2. If it is assumed that $Y_R(i,j)$, $C1_R(i,j)$, and $C2_R(i,j)$ respectively represent the luminance data, the first chromaticity data, and the second chromaticity data of a pixel (i,j) in the reference image RI, and $Y_M(i,j)$, $C1_M(i,j)$, and $C2_M(i,j)$ respectively represent the luminance data, the first chromaticity data, and the second chromaticity data of the pixel (i,j) in a matching image, the similarity calculation unit 52 may calculate a degree of similarity S between the reference image RI and the matching image by using Equation 1.

$$S = \alpha \Sigma |Y_R(i,j) - Y_M(i,j)| + \beta \Sigma |C1_R(i,j) - C1_M(i,j)| + \gamma \Sigma |C2_R(i,j) - C2_M(i,j)| \tag{1}$$

Here, $\alpha < \beta$, $\alpha < \gamma$, and $\alpha$, $\beta$, and $\gamma$ are positive weights having constant values. However, a method of calculating a degree of similarity in the similarity calculation unit 52 of the digital image processing apparatus is not limited to Equation 1. For example, Equation 2 may also be used.

$$S = \alpha \Sigma |Y_R(i,j) - Y_M(i,j)|^2 + \beta \Sigma |C1_R(i,j) - C1_M(i,j)|^2 + \gamma \Sigma |C2_R(i,j) - C2_M(i,j)|^2 \tag{2}$$

In more detail, each pixel of the frame image FI has luminance data Y, first chromaticity data C1, and second chromaticity data C2. If it is assumed that $Y_R(i,j)$, $C1_R(i,j)$, and $C2_R(i,j)$ respectively represent the luminance data, the first chromaticity data, and the second chromaticity data of a pixel (i,j) in the reference image RI, $Y_M(i,j)$, $C1_M(i,j)$, and $C2_M(i,j)$ respectively represent the luminance data, the first chromaticity data, and the second chromaticity data of the pixel (i,j) in a matching image, and $Y_R(i,j)-Y_M(i,j)$, $C1_R(i,j)-C1_M(i,j)$, and $C2_R(i,j)-C2_M(i,j)$ respectively represent a luminance value, a first chromaticity value, and a second chromaticity value, the degree of similarity between the reference image RI and the matching image may be calculated by using Equation 3 wherein $\alpha < \beta$, $\alpha < \gamma$, and $\alpha$, $\beta$, and $\gamma$ are positive weights.

$$S = \alpha \times \{\text{luminance value}\} + \beta \times \{\text{first chromaticity value}\} + \gamma \times \{\text{second chromaticity value}\} \tag{3}$$

In Equations 1 through 3, $\alpha < \beta$, $\alpha < \gamma$, and $\alpha$, $\beta$, and $\gamma$ are positive weights having constant values. Thus, for example, if YCbCr data has a data size ratio of 4:2:2, $\alpha=1$ and $\beta=\gamma=2$. In general, the data size of the first chromaticity data C1 may be equal to the data size of the second chromaticity data C2 and thus $\beta=\gamma$. If the data size of the first chromaticity data C1 is different from the data size of the second chromaticity data C2, $\beta \neq \gamma$.

When the similarity calculation unit 52 calculates the degree of similarity between each matching image and the reference image RI as described above, the target image determination unit 54 determines one of the matching images which has the lowest degree of similarity with the reference image RI as the target image TI.

Although the digital photographing apparatus is described as a representative example of a digital image processing apparatus, the invention is not limited thereto.

FIG. 9 is a flowchart of a tracking method according to an embodiment of the invention.

Referring to FIG. 9, a degree of similarity between a reference image and each of a plurality of matching images that are portions of a current frame image and has the same size as the reference image is calculated by applying a greater weight to other data than to luminance data (operation S10). Then, one of the matching images is determined as a target image by using the degree of similarity (operation S20). As a greater weight is applied to the other data than to the luminance data when the degree of similarity is calculated (operation S10), unlike a conventional tracking method using Equation 4, even in various cases, for example, when the intensity of luminance is changed, the target image may be accurately determined and thus rapid and accurate tracking may be performed.

The calculating of the degree of similarity (operation S10) will now be described in detail.

If it is assumed that each pixel of the current frame image has luminance data Y, first chromaticity data C1, and second chromaticity data C2, $Y_R(i,j)$, $C1_R(i,j)$, and $C2_R(i,j)$ respectively represent the luminance data, the first chromaticity data, and the second chromaticity data of a pixel (i,j) in the reference image, and $Y_M(i,j)$, $C1_M(i,j)$, and $C2_M(i,j)$ respectively represent the luminance data, the first chromaticity data, and the second chromaticity data of the pixel (i,j) in a matching image, a degree of similarity S between the reference image and the matching image is calculated by using Equation 1 wherein $\alpha < \beta$, $\alpha < \gamma$, and $\alpha$, $\beta$, and $\gamma$ are positive weights. As defined above, and repeated here:

$$S = \alpha \Sigma |Y_R(i,j) - Y_M(i,j)| + \beta \Sigma |C1_R(i,j) - C1_M(i,j)| + \gamma \Sigma |C2_R(i,j) - C2_M(i,j)| \tag{1}$$

However, a method of calculating a degree of similarity is not limited to Equation 1. For example, Equation 2 may also be used.

$$S = \alpha \Sigma |Y_R(i,j) - Y_M(i,j)|^2 + \gamma \Sigma |C2_R(i,j) - C2_M(i,j)|^2 \tag{2}$$

In more detail, if it is assumed that each pixel of the current frame image has luminance data Y, first chromaticity data C1, and second chromaticity data C2, $Y_R(i,j)$, $C1_R(i,j)$, and $C2_R(i,j)$ respectively represent the luminance data, the first chromaticity data, and the second chromaticity data of the pixel (i,j) in the reference image, $Y_M(i,j)$, $C1_M(i,j)$, and $C2_M(i,j)$ respectively represent the luminance data, the first chromaticity data, and the second chromaticity data of the pixel (i,j) in a matching image, and $Y_R(i,j)-Y_M(i,j)$, $C1_R(i,j)-C1_M(i,j)$, and $C2_R(i,j)-C2_M(i,j)$ respectively represent a luminance value, a first chromaticity value, and a second chromaticity value, the degree of similarity S between the reference image and the matching image may be calculated by using Equation 3 wherein $\alpha<\beta$, $\alpha<\gamma$, and $\alpha$, $\beta$, and $\gamma$ are positive weights.

$$S=\alpha\times\{\text{luminance value}\}+\beta\times\{\text{first chromaticity value}\}+\gamma\times\{\text{second chromaticity value}\} \quad (3)$$

In Equations 1 through 3, $\alpha<\beta$, $\alpha<\gamma$, and $\alpha$, $\beta$, and $\gamma$ are positive weights having constant values. Thus, for example, if YCbCr data has a data size ratio of 4:2:2, $\alpha=1$ and $\beta=\gamma=2$. In general, the data size of the first chromaticity data C1 may be equal to the data size of the second chromaticity data C2 and thus $\beta=\gamma$. If the data size of the first chromaticity data C1 is different from the data size of the second chromaticity data C2, $\beta\neq\gamma$.

The determining of the target image (operation S20) may include determining one of the matching images, which has the lowest degree of similarity with the reference image, as the target image.

A computer program that can be executed on a processor for executing the tracking method in the digital photographing apparatus may be stored in a recording medium. The recording medium may be, for example, the memory 60 or the storage medium 70 illustrated in FIG. 1, or any other recording medium such as a magnetic storage medium (e.g., ROM, a floppy disk, or a hard disk) or an optical recording media (e.g., compact disc (CD)-ROM or a digital versatile disc (DVD)).

In addition, the invention is not limited to the digital image processing apparatus described above with reference to FIG. 1. Any digital image processing apparatus adopting the tracking method illustrated in FIG. 9 is included in the scope of the invention.

As described above, according to an embodiment of the invention, a digital image processing apparatus, a tracking method, a recording medium for storing a computer program for executing the tracking method, and a digital image processing apparatus adopting the tracking method, which may rapidly and accurately track the location of a subject in a video image, may be realized.

The system or systems described herein may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

Embodiments of the invention may be described in terms of functional block components and various processing steps. Such functional blocks may be realized by any number of hardware and/or software components configured to perform the specified functions. For example, embodiments of the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A digital image processing apparatus for searching for a target image that is most similar to a reference image, in a current frame image in which each pixel has luminance data and chromaticity data, the reference image being smaller than the current frame image, the apparatus comprising:
a similarity calculation unit for calculating a degree of similarity between the reference image and each of a plurality of matching images that have a same size as the reference image and are portions of the current frame image; and
a target image determination unit for determining one of the plurality of matching images as the target image by using the degree of similarity that is obtained by the similarity calculation unit,
wherein the similarity calculation unit calculates the degree of similarity by applying a greater weight to the chromaticity data than to the luminance data by multiplying the chromaticity data by a first coefficient that has a greater magnitude than a corresponding second coefficient that is multiplied by the luminance data.

2. The apparatus of claim 1, wherein:
each pixel of the current frame image has luminance data Y, first chromaticity data C1, and second chromaticity data C2; and
if it is assumed that YR(i,j), C1R(i,j), and C2R(i,j) respectively represent luminance data, first chromaticity data, and second chromaticity data of a pixel (i,j) in the reference image, and YM(i,j), C1M(i,j), and C2M(i,j) respectively represent luminance data, first chromaticity data, and second chromaticity data of a pixel (i,j) in a matching image, the similarity calculation unit calculates a degree of similarity S between the reference image and the matching image by using Equation 1

$$S = \alpha \Sigma |YR(i,j) - YM(i,j)| + \beta \Sigma |C1R(i,j) - C1M(i,j)| + \gamma \Sigma |C2R(i,j) - C2M(i,j)| \qquad (1)$$

where $\alpha < \beta$, $\alpha < \gamma$, and $\alpha$, $\beta$, and $\gamma$ are positive weights.

3. The apparatus of claim 2, wherein $\beta = \gamma$.

4. The apparatus of claim 1, wherein:
each pixel of the current frame image has luminance data Y, first chromaticity data C1, and second chromaticity data C2, and
if it is assumed that YR(i,j), C1R(i,j), and C2R(i,j) respectively represent luminance data, first chromaticity data, and second chromaticity data of a pixel (i,j) in the reference image, and YM(i,j), C1M(i,j), and C2M(i,j) respectively represent luminance data, first chromaticity data, and second chromaticity data of a pixel (i,j) in a matching image, the similarity calculation unit calculates a degree of similarity S between the reference image and the matching image by using Equation 2

$$S = \alpha \Sigma |YR(i,j) - YM(i,j)|2 + \beta \Sigma |C1R(i,j) - C1M(i,j)|2 + \gamma \Sigma |C2R(i,j) - C2M(i,j)|2 \qquad (2)$$

where $\alpha < \beta$, $\alpha < \gamma$, and $\alpha$, $\beta$, and $\gamma$ are positive weights.

5. The apparatus of claim 4, wherein $\beta = \gamma$.

6. The apparatus of claim 1, wherein:
each pixel of the current frame image has luminance data Y, first chromaticity data C1, and second chromaticity data C2, and
if it is assumed that YR(i,j), C1R(i,j), and C2R(i,j) respectively represent luminance data, first chromaticity data, and second chromaticity data of a pixel (i,j) in the reference image, and YM(i,j), C1M(i,j), and C2M(i,j) respectively represent luminance data, first chromaticity data, and second chromaticity data of a pixel (i,j) in a matching image, and YR(i,j)−YM(i,j), C1R(i,j)−C1M(i,j), and C2R(i,j)−C2M(i,j) respectively represent a luminance value, a first chromaticity value, and a second chromaticity value, the similarity calculation unit calculates a degree of similarity S between the reference image and the matching image by using Equation 3

$$S = \alpha \times \{\text{luminance value}\} + \beta \times \{\text{first chromaticity value}\} + \gamma \times \{\text{second chromaticity value}\} \qquad (3)$$

where $\alpha < \beta$, $\alpha < \gamma$, and $\alpha$, $\beta$, and $\gamma$ are positive weights.

7. The apparatus of claim 6, wherein $\beta = \gamma$.

8. The apparatus of claim 1, wherein the target image determination unit determines one of the plurality of matching images which has the lowest degree of similarity with the reference image as the target image.

9. A tracking method of searching for a target image that is most similar to a reference image, in a current frame image in which each pixel has luminance data and chromaticity data, the reference image being smaller than the current frame image, the method comprising:
calculating, using a processor of a digital image processing apparatus, a degree of similarity between the reference image and each of a plurality of matching images that have a same size as the reference image and are portions of the current frame image by applying a greater weight to the chromaticity data than to the luminance data by multiplying the chromaticity data by a first coefficient that has a greater magnitude than a corresponding second coefficient that is multiplied by the luminance data.

10. The method of claim 9, wherein each pixel of the current frame image has luminance data Y, first chromaticity data C1, and second chromaticity data C2, the method further comprising:
calculating a degree of similarity S between the reference image and a matching image using Equation 1

$$S = \alpha \Sigma |YR(i,j) - YM(i,j)| + \beta \Sigma |C1R(i,j) - C1M(i,j)| + \gamma \Sigma |C2R(i,j) - C2M(i,j)| \qquad (1), \text{ and}$$

where $\alpha < \beta$, $\alpha < \gamma$, and $\alpha$, $\beta$, and $\gamma$ are positive weights; and
where YR(i,j), C1R(i,j), and C2R(i,j) respectively represent luminance data, first chromaticity data, and second chromaticity data of a pixel (i,j) in the reference image, and YM(i,j), C1M(i,j), and C2M(i,j) respectively represent luminance data, first chromaticity data, and second chromaticity data of a pixel (i,j) in a matching image.

11. The method of claim 10, wherein $\beta = \gamma$.

12. The method of claim 9, wherein each pixel of the current frame image has luminance data Y, first chromaticity data C1, and second chromaticity data C2, the method further comprising:
calculating a degree of similarity S between the reference image and a matching image using Equation 2

$$S = \alpha \Sigma |YR(i,j) - YM(i,j)|2 + \beta \Sigma |C1R(i,j) - C1M(i,j)|2 + \gamma \Sigma |C2R(i,j) - C2M(i,j)|2 \qquad (2)$$

where $\alpha < \beta$, $\alpha < \gamma$, and $\alpha$, $\beta$, and $\gamma$ are positive weights; and
where YR(i,j), C1R(i,j), and C2R(i,j) respectively represent luminance data, first chromaticity data, and second chromaticity data of a pixel (i,j) in the reference image, and YM(i,j), C1M(i,j), and C2M(i,j) respectively represent luminance data, first chromaticity data, and second chromaticity data of the pixel (i,j) in a matching image.

13. The method of claim 12, wherein $\beta=\gamma$.

14. The method of claim 9, wherein each pixel of the current frame image has luminance data Y, first chromaticity data C1, and second chromaticity data C2, the method further comprising:

calculating a degree of similarity S between the reference image and a matching image using Equation 3

$$S=\alpha\times\{\text{luminance value}\}+\beta\times\{\text{first chromaticity value}\}+\gamma\times\{\text{second chromaticity value}\} \quad (3)$$

where $\alpha<\beta$, $\alpha<\gamma$, and $\alpha$, $\beta$, and $\gamma$ are positive weights; and where YR(i,j), C1R(i,j), and C2R(i,j) respectively represent luminance data, first chromaticity data, and second chromaticity data of a pixel (i,j) in the reference image, and YM(i,j), C1M(i,j), and C2M(i,j) respectively represent luminance data, first chromaticity data, and second chromaticity data of pixel (i,j) in a matching image, and YR(i,j)−YM(i,j), C1R(i,j)−C1M(i,j), and C2R(i,j)−C2M(i,j) respectively represent a luminance value, a first chromaticity value, and a second chromaticity value.

15. The method of claim 14, wherein $\beta=\gamma$.

16. The method of claim 9, further comprising:
determining one of the plurality of matching images which has the lowest degree of similarity with the reference image to be the target image.

17. A computer program product, comprising a non-transitory computer readable storage medium having a computer readable program code embodied therein, said computer readable program code adapted to be executed to implement a tracking method of searching for a target image that is most similar to a reference image, in a current frame image in which each pixel has luminance data and chromaticity data, the reference image being smaller than the current frame image, the method comprising:

calculating, using a processor of a digital image processing apparatus, a degree of similarity between the reference image and each of a plurality of matching images that have a same size as the reference image and are portions of the current frame image by applying a greater weight to the chromaticity data than to the luminance data by multiplying the chromaticity data by a first coefficient that has a greater magnitude than a corresponding second coefficient that is multiplied by the luminance data.

18. The apparatus of claim 1, wherein the plurality of matching images are selected within a search region of the current frame image.

* * * * *